FIG. 1A

INVENTORS J.C. RICE
R.R. WELLS

FIG. 1B

INVENTORS J.C. RICE
R.R. WELLS

May 9, 1967 J. C. RICE ET AL 3,319,254
AUDIENCE REACTION DEVICES
Original Filed March 20, 1962 5 Sheets-Sheet 3

INVENTORS J.C. RICE
R.R. WELLS

United States Patent Office 3,319,254
Patented May 9, 1967

3,319,254
AUDIENCE REACTION DEVICES
Joseph Charles Rice, Tarzana, and Ralph R. Wells, Van Nuys, Calif., assignors, by mesne assignments, to Screen Gems, Inc., New York, N.Y., a corporation of Delaware
Continuation of application Ser. No. 181,080, Mar. 20, 1962. This application Apr. 20, 1965, Ser. No. 451,682
51 Claims. (Cl. 346—37)

This application is a continuation of U.S. application Ser. No. 181,080, filed Mar. 20, 1962, now abandoned.

This invention relates to data processing apparatus, and more particularly, as illustrated by the embodiment described below, to arrangements for sensing, displaying and recording representations of the reactions of an audience to the whole or part of a theatrical or other performance.

Evaluations of audience reaction to theatrical or other type performances, particularly in view of the economics involved in today's mass entertainment industry, are finding an increasingly significant role in the formulation and scheduling of future productions. Of the manifold problems encountered in deriving such evaluations, perhaps the most formidable involve the acquisition of information indicating an accurate measure of audience effect, discerning audience effect not only upon particular individuals, but upon predetermined subgroups of an audience as well, and finally, displaying the results of the analysis with maximum effectiveness. At first, and still prevalent in connection with "live" performances, such evaluations were based on audience reactions in the form of applause, laughter, and the like. Although such indications have generally been found to express the opinion of an audience with a relatively high degree of accuracy, it is extremely difficult to distinguish between the reactions of different individuals, or different groups, say all females for example, within the audience, in addition to which the system largely fails to analyze and account for interludes in which reactions such as supense or fear are experienced. Furthermore, such a system is particularly deceptive in the presence of either an overly or an underly demonstrative audience.

In an attempt to alleviate at least a portion of the foregoing shortcomings, audience reactions in the form of answers to written questionnaires are often solicited at the termination of a performance. While answers to such inquiries can obviously express all possible reactions of a viewer, they are retrospective and tend to lose their spontaneity to the overall average reaction. Stated somewhat differently, the normal viewer when exposed to an exceptional performance, good or bad, tends to rate each episode as exceptional, even though at the time performed he felt it to be vastly superior, or inferior as the case may be, to the general tenor of the performance. In addition, the number of handwritten answers which can be obtained from an audience is severely limited by a fatigue factor, and the tabulation of such written results is often slow and relatively inefficient.

As a further refinement to the art of evaluating audience reactions, electrical arrangements were devised heretofore to sense and record continuously the reactions of a selected audience during a performance. In most cases, however, such arrangements were developed only to the limited degree wherein they would elicit the response of an audience as a whole, neglecting the individual reactions of any particular member or any statistically selected subgroup of the audience. Such information, while of course useful, was found to fall considerably short of a comprehensive analysis of the type which could more nearly maximize the effectiveness of reaction evaluation.

Accordingly, a principal object of the invention is to sense, display, and permanently record the continuous reactions of members of an audience to a theatrical or other performance on a group, subgroup, and an individual basis.

It is another object of the invention to maximize the effectiveness of audience reaction evaluations.

It is another object of the invention to derive and permanently record a plurality of different categories of information respecting the reactions of an audience with only minimum effort on the part of the individual audience members.

It is still another object of the invention to increase the categories of information which have heretofore been derived with prior art audience reaction measuring devices.

It is a further object of the invention to present information representative of audience reactions in clear, concise, and meaningful form.

The objects of the invention are accomplished, broadly, by the provision of a plurality of sensing means distributed individually to the members of an audience and adapted to furnish individual signals which are fully variable over a discrete range of values, means for selectively detecting at least a preselected portion of the signals, a plurality of recording devices, first switching means operative to select any particular one of the individual signals and apply it so as to activate one of the recording devices, second switching means operative to apply the signals both in aggregate and in selected subgroups to actuate other recording devices, time division multiplexing apparatus operative to apply the signals in sequential order to activate still another recording device, and resolving means for determining and recording on yet another recording device the proportion of signals which reside at any selected time in predetermined increments of values through which the signals may vary.

One feature of the invention resides in an arrangement for deriving a compendium of audience reaction by sequentially recording in incremental steps continuously variable signals representative of the individual reactions of selected members of an audience. In an illustrative embodiment of this feature, a plurality of reaction sensing means such as potentiometers are distributed throughout an audience and have their wiper arms individually connected to the input terminals of a scanner. The output signal from the scanner, which is representative of the various reactions of the audience members in time division multiplex, is applied to a converter which comprises for its output circuit a plurality of terminals, each of which individually renders an output signal of uniform level in response to an input signal to the converter having the level which is to be represented by that particular output terminal. Each output terminal of the converter is connected to an individual stylus of a multiline electrographic recorder which charts in sequential order the individual reactions of the selected audience members.

Another feature of the invention resides in an arrangement for deriving continuous indications of the reactions of the audience as a whole. Such an arrangement may, as one convenient example, involve a plurality of potentiometers individually distributed through an audience, and having the wiper arm of each connected directly through suitable switching means and an isolating impedance to the input terminal of a recording device.

Another feature of the invention resides in an arrangement for segregating selected members of an audience into a number of different subgroups independent of the physical seating pattern and examining the signals representative of the composite reactions of the individual subgroups. In one embodiment of such an arrangement, a plurality of potentiometers distributed through an audience have their wiper arms individually connected to a corresponding plurality of multiposition switching mechanisms. Each switch is operative to connect the wiper arm associated with it either to any of a number of single recorders or any combination of pairs of the recorders in accordance with the position in which the switch resides. Each switch also incorporates isolation impedances which allow signals from the wiper arms to be summed directly by the recorders.

Still another feature of the invention resides in an arrangement for continuously monitoring the reactions of selected individual members of an audience. Such an arrangement is exemplified by the combination of a plurality of potentiometers individually distributed throughout an audience and suitable switching means, capable of selecting the wiper arm of any one of the potentiometers, connected to channel signals appearing on the selected arm to a recorder.

A further feature of the invention resides in an arrangement for deriving a plurality of test signals useful for purposes of calibration and the like, which may be applied upon command to the recording devices along with signals representing audience reactions.

Yet another feature of the invention resides in an electronic scanning arrangement by means of which signals appearing on a plurality of input lines, each line originating from a sensing device under the control of an audience member, are periodically sampled and intermeshed in time division multiplex relationship with each other on a single output line. Such an arrangement also features a variable speed clock mechanism with which the sampling rate may be selectively varied from a relatively high rate down to the point where the output line dwells indefinitely on any selected one of the input lines.

In addition to the features listed above, a still further feature of the invention resides in an arrangement for selecting for reaction evaluation purposes only a convenient portion of an entire viewing audience. In one example of such an arrangement, reaction sensing means are distributed to substantially all members of an audience, the output leads of the sensing means being terminated in a patchboard type device. Electrical straps are then provided for coupling the output leads of only selected members of the audience having sensing means to the remainder of the evaluation facilities. Such an arrangement facilitates the restoration of a statistically selected audience to a full complement by the substitution of a replacement member should one of the originally selected members leave or otherwise become disabled from operating his reaction sensing means. Such an arrangement further provides means for rapidly changing the statistical composition of an audience group without necessitating seating changes by the audience.

Another feature of the invention resides in an arrangement for generating a transitory visual display representing the reactions of individual members of the audience in sequential order. In one illustrative arrangement embodying such a feature electrical signals representing in amplitude the reactions of individual members of an audience are applied as input signals in sequential order to a converter which comprises for its output circuit a plurality of terminals, each of which corresponds to an input signal of a different amplitude. A plurality of lamps, individually connected to the output terminals of the converter, render a sequential visual display of the reactions of the individual members of the audience.

Still another feature of the invention resides in an arrangement for indicating which member of an audience is having his reactions sampled and recorded at any particular time. In addition, this feature also includes means for indicating when calibrating signals are being applied to the entire system for test purposes.

Yet another feature of the invention resides in an arrangement to facilitate a determination of the percentage of selected members of an audience whose reactions fall within predetermined categories into which the entire range of measurable reactions are divided.

A still further feature of the invention resides in an arrangement for inscribing marks on the chart of an electrographic recorder which indicates the occurrence of selected events.

The foregoing and other features and objects of the invention will be more thoroughly understood by reference to the following detailed description of an illustrative embodiment of the invention, considered in conjunction with the drawings of which.

Figure 1A:
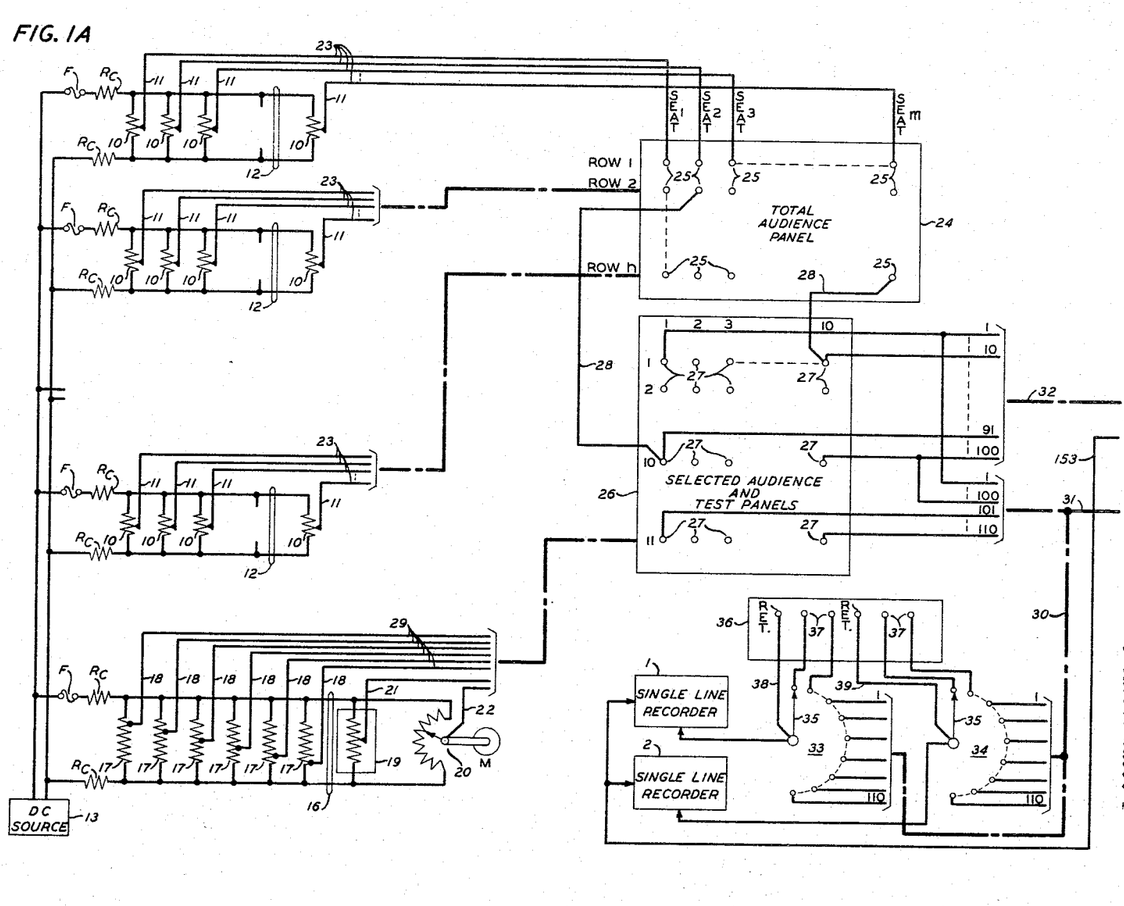
FIGS. 1A and 1B, which will hereinafter be referred to jointly as FIG. 1, illustrate mainly in functional block form one embodiment of an audience reaction evaluation system operative in accordance with the principles of the invention.
Figure 1B:
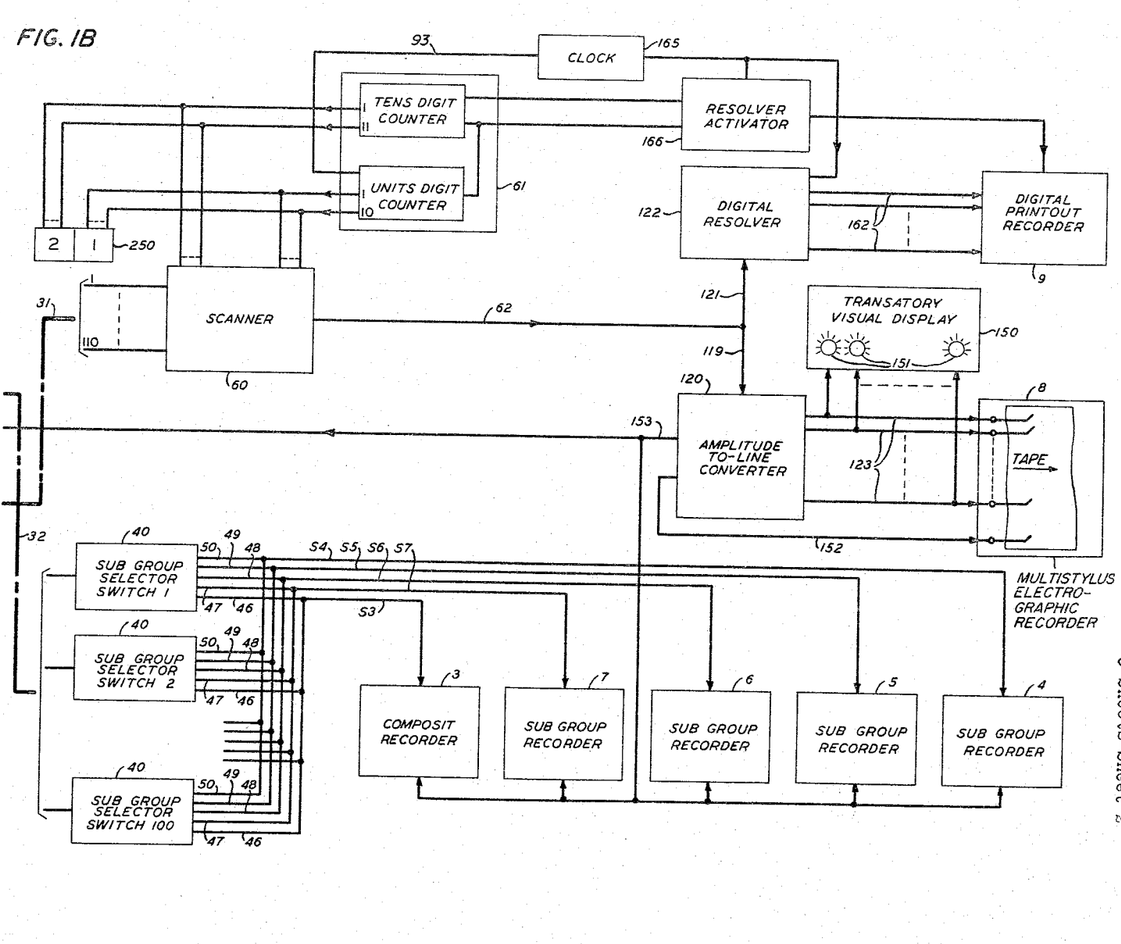

With reference to the drawings, FIG. 1 illustrates, mainly in functional block diagram form, a reaction sensing and recording system constructed in accordance with the principles of the invention in which electrical signals representative of the reactions of individual members of a viewing or listening audience are derived and applied in various orders and combinations to a variety of types of recording devices 1 through 9. For convenience of description the audience may be considered to be seated in a theater or similar auditorium comprising rows 1 through $n$, each containing seat 1 through $m$. Each seat in the theater is equipped with a potentiometric-type mechanism represented schematically by resistors 10 and their associated movable pickoff or wiper arms 11. As shown, the resistors 10 of each row are electrically interconnected in parallel relationship by sets of cables 12 all of which emanate from a common source of unidirectional potential 13. Compensating resistors $R_c$ are connected in series with each cable 12 to compensate for differences in line length from source 13 and thereby equalize the potential across all resistors 10. Accordingly, the values of resistors $R_c$ decrease as the rows with which they are associated are further separated from source 13. Owing to the presence of fuses F, if the cable 12 associated with any of the rows becomes short circuit, only signals derived from the defective row are disengaged from the system while the remainder of the signals continue to be processed in normal fashion.

Figures 2, 3A, 4:
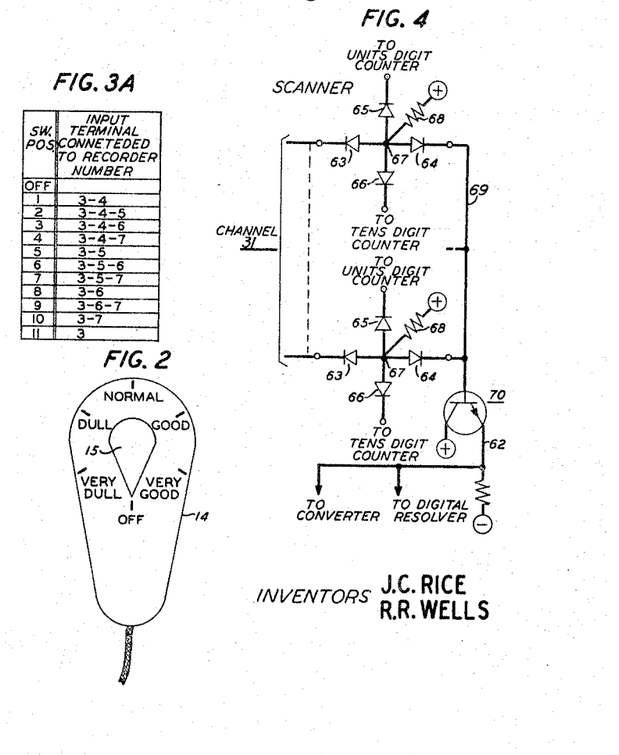
FIG. 2 depicts an illustrative dial face and selector knob by means of which audience members register their reactions to the performance being viewed.
FIG. 3A describes in tabular form the combinations of recorders to which input signals to a switch of FIG. 3 are applied in accordance with selector arm position.
FIG. 4 shows in schematic form one illustrative embodiment of a circuit configuration of the scanner represented in FIG. 1 as a functional block.

The audience members continuously express their reactions during the presentation of a performance by means of calibrated dial mechanisms or similar devices such as the one depicted in FIG. 2. To facilitate ease of handling, the dial faces 14 are ovoid in cross section and sized to fit easily into the palm of an ordinary hand. A selector knob 15, which is rotatably mounted in the center of dial face 14, is mechanically coupled to the wiper arm 11 associated with that particular dial so as to select the fractional voltage of source 13 which represents the opinion of the viewer manipulating the dial. Although as shown in FIG. 2 dial face 14 is calibrated in equal segments of subjective criteria; namely, very dull, dull, normal, good, and very good, such indica are merely illustrative, any suitable spacing or labeling sufficing equally as well.

With reference again directed to the system of FIG. 1, a test signal cable 16 is connected in parallel with cables 12, and as such, is energized by source 13. Cable 16 includes serially disposed compensating resistors $R_c$ to render the potential applied to its conductors equal to the potential across resistors 10 and, in addition, is individually fused to prevent malfunctioning apparatus connected to the cable from disabling the operation of the remainder of the system. As may be deduced from its name, the function of test signal cable 16 is to derive a plurality of known test potentials which, as will be fully explained below, may be processed through the system upon command for purposes of calibration or the like. As shown in the drawing, apparatus is bridged across cable 16 capable of generating a variety of different test potentials. More particularly, a plurality of shunt resistors 17 are provided having associated pickoff leads 18 which are respectively connected to the resistors 10 at points of decreasing impedance so as to furnish a series of test signals having fixed fractional relationships with respect to the potential of cable 16. For purposes of illustration, the pickoff leads 18 are shown positioned to detect potentials of one hundred, eighty, sixty, forty, twenty, and zero percent of the potential applied across cable 16. A precision variable potentiometer 19 and a motor driven potentiometer 20 are also bridged across cable 16 for respectively providing on their output terminals 21 and 22 any desired fractional portion of the potential of cable 16 and a linear saw tooth wave. Although specific apparatus is shown in the drawing for deriving the particular test signals described above, it should be obvious to anyone skilled in the art that numerous and varied other arrangements may be provided to furnish either the same or other useful test signals.

Each wiper arm 11 is connected via a lead 23 to a corresponding receptacle 25 of a conventional patch board 24. For convenience of illustration, receptacles 25 are shown mounted in a rectangular array corresponding to the seating arrangement of the auditorium in which the evaluation is being conducted. Among other of its advantages, patch board 24 serves as convenient centralized transfer device from which reaction signals derived from all or any selected portion of the audience are detected and applied to subsequent parts of the system. Preferably, receptacles 25 are conventional jacks of the variety which accommodate plug terminated connectors so that the order in which signals emanating from patch board 24 are applied to different points in the system may be varied with maximum facility. While a patch board is specifically illustrated in the drawings, it should be recognized that other arrangements well known to the art, such as rotary or crossbar switches for example, can be utilized to obtain similar results.

Although signals representing the reactions of all the audience members are available at patch board 24, it is neither necessary nor desirable to utilize all of these signals in evaluating a performance. For example, while a particular audience viewing a performance might be composed predominantly of a single category of individuals, say women, it may be desirable to evaluate the performance with respect to an audience in which men and women are substantially equal in numbers. In such a situation it would be possible to obtain a balanced audience for evaluation purposes by utilizing the signals which represent only a portion of the total number of women in the audience. Furthermore, in the example set forth above, should the signals derived from one or more women selected for evaluation be rendered useless, say one of the selected women leaves her seat for example, any of the remaining unselected women may be substituted in her place so that proper statistical balance is maintained throughout the evaluation. Accordingly, a second patch board arrangement 26 is provided having receptacles 27, similar in construction to their counterparts 25, to which only the signals of the selected members of the audience are coupled. The cross connectors by which signals from selected members of the audience are coupled from patch board 24 to patch board 26 comprise a plurality of individual lead wires 28 terminated by plugs which are insertable into receptacles 25 and 27. As shown in the drawing, patch board 26 includes an array of one hundred receptacles 27 to which signals representative of an equal number of audience members may be coupled from patch board 24 via connectors 28. The selection of one hundred audience members for evaluation, while not mandatory, is particularly advantageous in that it facilitates subsequent analysis directly in terms of percentages. The bottom row of receptacles 27 on patch board 26 are severally energized via leads 29 with the test potentials generated by the test potential generators connected to cable 16. Inasmuch as only eight test signals are shown being generated, only eight of the ten bottom row receptacles will be energized, thereby leaving two idle receptacles.

Receptacles 27 are connected to succeeding portions of the system by three separate channels 30, 31, and 32. Channel 30 comprises one hundred and ten conductors, one hundred of these representing audience members selected from patch board 24 whose signals have been transferred to patch board 26 via connectors 29, and the remaining ten conductors representing the test or bottom row of receptacles 27. Each conductor in channel 30 is connected to a single terminal post in each of two manually operable rotary selector switches 33 and 34. Selector arms 35 of the switches are respectively connected to the pen drive units of single line chart recorders 1 and 2. Recorders 1 and 2 are of the conventional variety in which a pen or other stylus is transversally driven across a moving chart so as to produce a continuous analog record with respect to time of the magnitude of applied signals. A pair of terminal posts on each of rotary switches 33 and 34 are individually connected to pairs of receptacles 37 of patch board 36. As shown, leads 38 and 39 join selector arms 34 and 35, respectively, with the remaining receptacles 37, thereby providing easily accessible outlets from which signals applied to recorders 1 and 2, regardless of their origin, may be simultaneously applied to other portions of the system.

The use of a pair of recorders 1 and 2, rather than a single recorder, is advantageous for several reasons. Firstly, and perhaps most apparent, the capacity of the system to record reaction signals of individual audience members is increased by a multiple of the number of recorders employed; and secondly, fidelity of transmission through the whole or any part of the system may be easily determined for purposes of detecting malfunctions and the like by simply connecting one recorder to the input and one recorder to the output of the apparatus to be checked, and measuring the accuracy with which the latter recorder tracks the former.

Figure 3:
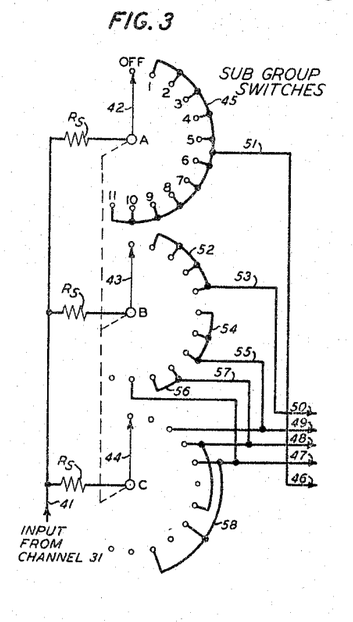
FIG. 3 illustrates one example of a subgroup selector switch and its associated electrical strapping which enables an input signal representative of audience reactions to be selectively applied to different groups of recorders via individual output leads.

The one hundred receptacles 27 which represent the audience members selected for evaluation are individually connected to one hundred manually operable multideck switches 40 via the conductors of channel 32. Switches 40, labeled subgroup selector switches, function as a group to selectively segregate the one hundred member selected audience into five distinct groups, and apply potentials representative of the average reaction of each group to separate recorders 3 through 7. One example of a switch 40 operative in accordance with the principles of the invention is illustrated schematically in FIG. 3 as a three-deck twelve position selector switch. Input signals to the particular switch 40 of FIG. 3 are applied by a conductor 41, which is energized by one of the conductors comprising channel 32, to the mechanically ganged selector arms 42, 43, and 44 of decks A, B, and C, respectively, through high impedance summing resistors $R_s$. As drawn and labeled, the uppermost position of the switch represents the OFF condition in which signals appearing on line 41 are not transferred to any of the recorders 3 through 7. Terminal posts signifying the remaining eleven positions available on deck A of the switch are conductively strapped together along wire 45 which is connected to output lead 46 by conductor 51. As shown in FIG. 1, output lead 46 is joined to summing bus $S_3$ which energizes the pen drive unit of composite recorder 3. Of the active eleven terminal posts of deck B, the upper 4 are strapped together along wire 52 which is connected by conductor 53 to output lead 50. In turn, output lead 50 is joined to summing bus $S_4$ which energizes the pen drive unit of subgroup recorder 4. The three deck-B terminal posts next in line are strapped together along wire 54 which is connected to output lead 49 by conductor 55. As shown by FIG. 1, lead 49 is joined to summing bus $S_5$ which energizes the pen drive unit of subgroup recorder 5. The succeeding pair of deck-B terminal posts are strapped together by wire 56 which is connected to output lead 48 by conductor 57. In turn, output lead 48 is joined to summing bus $S_6$ which energizes the pen drive unit of subgroup recorder 6. The tenth terminal post of deck B is connected to output terminal 47 which joins summing bus $S_7$ so as to apply input signals to the pen drive unit of subgroup recorder 7. With respect to the eleven active terminal posts of deck C, the description proceeding from top to bottom, the first, fifth, eighth, tenth and eleventh are idle, the second is connected to output lead 49, the third and sixth are strapped together by wire 59 and connected to output lead 48, and the fourth, seventh, and ninth are strapped together along conductor 58 which is connected to output lead 47.

With the terminal posts of switches 40 interconnected as illustrated in FIG. 3, output leads 46 through 50 will energize subgroup recorders 3 through 7 in accordance with the selector arm position schedule listed in the table of FIG. 3A. Thus, it will be recognized that by selectively applying input signals appearing on leads 41 to various combinations of output terminals 46 through 50, not only may the composite reaction of the selected one hundred member audience as a whole be recorded, but the composite reactions of any four chosen subgroups of the audience may also be recorded simultaneously. For example, in addition to deriving the average reaction of the selected audience as a whole, it may be desired to derive the average reactions of all male members of the audience, all female members of the audience, and all those above and below a certain age, as individual subgroups. If subgroup recorders 4 through 7 are respectively assigned to the above designated four special categories of sex and age, signals proportional to the average reaction of each category will be derived for application to a corresponding recorder by positioning the selector arms of the switches 40, which represent males older than the specified age, to the contact of the third active terminal post from the top, positioning the selector arms of the switches 40, which represent males younger than the specified age, to the contact of the fourth active terminal post from the top, and positioning the selector arms of switches 40, which represent females over and under the specified age, respectively, to the contacts of the sixth and seventh terminal posts from the top. Since all the deck A positions are strapped together along wire 45 and then connected through output lead 46 and summing bus $S_3$ to the pen drive unit of composite recorder 3, a continuous charted record of the average instantaneous reaction of the selected audience as a whole throughout the entire performance will be created regardless of the positions, other than OFF, in which the selector arms of switches 40 reside. By positioning the selector arms of the switches 40 which represent males over the specified age to the contacts of the third active terminal posts, signals representing the instantaneous average reactions of these individuals are also applied both to recorder 4 for inclusion in the average reaction of all males, and to recorder 6 for inclusion in the average reaction of all individuals, male or female, who are over the specified age. By similar analysis it can be easily shown how the remaining members of the selected audience are segregated into their respective categories.

Each of the one hundred and ten receptacles 27 of patch board 26 are connected via individual conductors comprising channel 31 to a scanning arrangement 60 which sequentially samples the individual signals on the conductors of channel 31 at a selectable rate determined by a counter 61 and applies the samples to a single output terminal 62 as a train of pulses. As shown, counter 61 is driven by pulses generated in a clock circuit 165. A more detailed drawing of scanner 60 is depicted in FIG. 4 where the individual conductors of channel 31 are shown being severally joined to corresponding four-diode AND gates. The anode electrodes of the four diodes 63 through 66 of each gate are joined together at a junction 67 to which a positive source of potential is coupled through a relatively high impedance 68. As shown, the cathodes of diodes 63 are individually connected to the conductors of channel 32, and the cathodes of diodes 64 are joined together along a common bus 69. The cathodes of diodes 65 and 66 are respectively connected to the UNITS DIGIT and TENS DIGIT portions of counter 61, in a manner to be explained in greater detail below, so that when the count of counter 61 corresponds to a particular one of the AND gates, the signal applied to diode 63 of that gate is transferred, so to speak, to bus 69. More particularly, counter 61, as will be shown below, normally applies a negative potential to the cathodes of diodes 65 and 66, thereby clamping the potential of junctions 67 to a negative supply. Since the cathodes of diodes 63 always reside at ground potential or above, they being directly traceable through channel 31 and patch boards 26 and 24 to the potential along resistors 10, these diodes are normally reverse biased. When the count of counter 61 corresponds to a particular AND gate, positive pulses are applied to cathodes of diodes 65 and 66 of that gate, thereby placing these diodes in the reverse-bias condition. Instantaneously, junction 67 of the gate in question is clamped to the potential appearing at the cathode of its diode 63, that is to say, the potential representing the reaction signal of the audience member or test apparatus corresponding to this gate. The positive potential now clamped to junction 67 of the particular AND gate representing the count of counter 61 is transferred through the associated diode 64 to bus 69 for application to the base electrode of emitter follower amplifier 70. Since all other junctions 67 are clamped to negative supply at this time, the positive potential on bus 69 serves to reverse bias all diodes 64 save the one through which the reverse-biasing potential is being transferred. As counter 61 operates in sequence, the potentials individually appearing on the conductors of channel 31 are successively applied through diodes 63 and 64 to bus 69, whereupon they appear in time division multiplex and are coupled to output lead 62 by amplifier 70.

Figure 5:
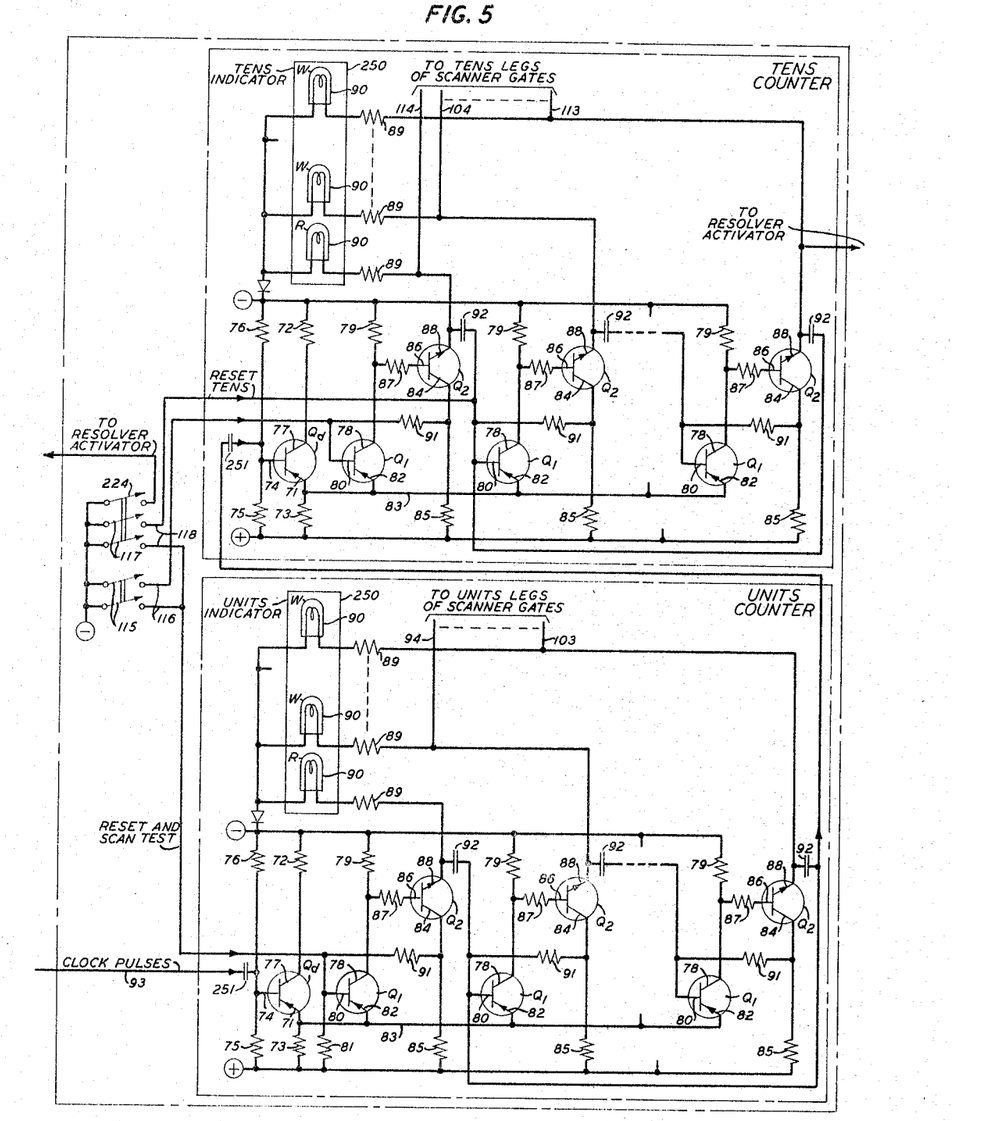
FIG. 5 illustrates a detailed representation of a counter circuit comprising UNITS DIGIT and TENS DIGIT counters and an indicator for continuously displaying the particular digits to which the counters have advanced.

It will be noted that scanner 60 includes AND gates for each of the test signal generators of cable 16 as well as for the selected one hundred members of the audience. During the course of a normal evaluation, however, it will usually be unnecessary to process the test signals of cable 16 through the system more than a few times. Accordingly, counter 61 is arranged and connected to scanner 60 so as to activate only the AND gates associated with the one hundred selected members of the audience during normal operation, but upon command, to scan in addition the AND gates associated with the ten test receptacles of patch board 26. An illustrative circuit arrangement of a counter operative in accordance with the foregoing principles is depicted in FIG. 5 as comprising a UNITS DIGIT ring counter and a TENS DIGIT ring counter interconnected, as will now be fully explained, to count to one hundred periodically, but upon the application of a suitable command signal, to count to one hundred and ten a single time, thereby enabling a scan of the test position AND gates, and then automatically return to the previous periodic count of one hundred.

The UNITS DIGIT and TENS DIGIT counters are substantially identical in design, each comprising a drive transistor $Q_d$ followed by eleven two-transistor counting stages. With respect to the UNITS DIGIT counter, driver transistor $Q_d$ comprises a PNP transistor having an emitter electrode 71 coupled to a positive source of potential through resistor 73, a collector electrode 77 coupled to a source of negative potential through resistor 72, and a base electrode 74 which is coupled to both the positive and negative sources through resistors 75 and 76, respectively. Each of the following eleven stages comprises a pair of transistors $Q_1$ and $Q_2$, the former being of the PNP and the latter being of the NPN variety. Transistor $Q_1$ includes a collector electrode 78 which is coupled to the negative source through resistor 79, a base electrode 80 which is coupled to the positive source through resistor 81, and an emitter electrode 82 which is coupled along a common emitter bus 83 to emitter 71 of transistor $Q_d$. Transistor $Q_2$ includes a collector electrode 84 which is coupled to the positive source through resistor 85, a base electrode 86 which is coupled to collector 78 of transistor $Q_1$ through resistor 87, and an emitter electrode 88 which is coupled to a negative source through a serially connected resistor 89, lamp 90, and a suitably poled diode. To complete the stage, collector 84 of transistor $Q_2$ is connected through feedback resistor 91 to base 80 of transistor $Q_1$. The stages are interconnected with each other by means of coupling capacitors 92 which connect emitters 88 of transistors $Q_2$ to bases 74 of transistors $Q_1$ of the next succeeding stage. It is to be particularly noted in this respect that capacitor 92 of the last, or eleventh, stage of the counter is connected to the base 74 of transistor $Q_1$ of the second, not the first, stage of the counter. So far as has been described, the TENS DIGIT counter is identical to the UNITS DIGIT counter and, therefore, need not be redescribed.

In operation, the transistors $Q_1$ and $Q_2$ of all stages except the stage then indicating a particular count are nonconducting. Correspondingly, the transistors $Q_1$ and $Q_2$ of the stage indicating a count are in their states of conduction. The count of the UNITS DIGIT counter is advanced by the application of negative going pulses from clock 165 (FIG. 1) via input lead 93 and a capacitor 251 is base 74 of driver transistor $Q_d$. This negative going clock pulse is coupled substantially undiminished to emitter 71 of transistor $Q_d$ and, consequently, is applied simultaneously through emitter bus 83 to emitters 82 of transistors $Q_1$ of all eleven stages. The negative going pulse compels no response from the transistors $Q_1$ which are nonconducting, these transistors merely being driven further into cutoff. The transistor $Q_1$ which is conducting, however, is driven toward cutoff by the application of a negative going pulse to its emitter 82, which action drives the collector 78 of that same transistor to the potential of the negative source. The negative potential applied to the collector 78 of the formerly conducting transistor $Q_1$ is coupled through resistor 87 to base 86 of the conducting transistor $Q_2$, thereby driving that transistor $Q_2$ toward its state of nonconduction. When transistor $Q_2$ is cutoff, its emitter 88 is driven in a negative sense to the potential of the negative supply. This negative going impulse is applied through coupling capacitor 92 to the base 80 of transistor $Q_1$ of the next succeeding stage so as to drive that transistor into conduction. Simultaneously, the potential of collector 84 of the formerly conducting transistor $Q_2$ approaches that of the positive source, which is fed back through resistor 91 so as to "snap" the formerly conducting transistor $Q_1$, figuratively speaking, fully into its nonconducting state. Current now begins to flow through the newly energized transistor $Q_1$ thereby driving its collector 78 positive, which impulse is coupled through resistor 87 to turn on transistor $Q_2$. Potential from the positive source is thereby coupled to the negative source through the emitter-to-collector path of the now conducting transistor $Q_2$, resistor 89, and neon lamp 90 and the diode. Lamp 90, which may be incandescent, is arranged so as to indicate on a suitable visual display device 250 (also shown in FIG. 1) the digit to which the count has progressed. Upon the application of the next clock pulse, the transistors of the conducting stage are driven to cutoff and the transistors of the succeeding stage are turned on in the same fashion as described above.

The TENS DIGIT counter operates in exactly the same fashion as the UNITS DIGIT counter except that input drive pulses to the former are derived from the last stage of the latter and applied through a driving capacitor 251. Thus, as would be expected, the count of the TENS DIGIT counter is advanced only a single increment for a complete cycle of operation of the UNITS DIGIT counter. It should be noted that the capacitance of driving capacitor 251 is preferably smaller than that of interstage coupling capacitors 92. This creates a drive pulse which is much narrower than the transfer pulse, allowing the turnoff voltage impressed across resistor 73 to return to normal before the pulse passed by capacitor 92 has decayed.

The individual stages of the UNITS DIGIT and TENS DIGIT counters are connected to scanner 60 by leads 94 through 103, which respectively represent the UNITS DIGIT numbers zero through nine, and leads 104 through 113, which respectively represent the TENS DIGIT numbers zero through nine. More particularly, lead 94 is connected in multiple to the cathodes of each diode 65 of all scanner AND gates (FIG. 4) corresponding to the counts having zero as their UNITS DIGIT, for example, 10, 20, 30, etc. At the other extreme, lead 103 is similarly connected in multiple to the cathodes of diodes 65 of all AND gates which correspond to the counts having nine as their UNITS DIGIT, for example, 9, 19, 29, etc. The intermediate leads 95 through 102 are similarly connected in multiple to the cathodes of diodes 65 of the scanner AND gates which correspond to the counts having as their UNITS DIGIT the numbers represented by the respective leads. Likewise, with respect to the TENS DIGIT counter, lead 104 is connected in multiple to the cathodes of diodes 66 of all scanner AND gates which correspond to counts having zero as their TENS DIGIT, for example, 01, 02, 03, etc. Similarly, lead 113 is connected in multiple to the cathodes of diodes 66 of all AND gates which correspond to counts having nine as their TENS DIGIT, such as 91, 92, 93, etc. The intermediate leads 105 through 112 are connected in multiple to the cathodes of diodes 66 of the AND gates which correspond to counts having as their TENS DIGITS the numbers represented by the respective leads. The count one hundred is represented by the zero-zero leads, 94 and 104, of the respective counters.

It will be noted that both the UNITS DIGIT and TENS DIGIT counters comprise eleven stages of which the last ten cooperate in counting from one to one hundred for scanning the selected audience. Accordingly, the coupling capacitor 92 of the last stage of each counter is connected back to turn on the second, or zero, stage of that counter. In order to scan the test potentials generated by the apparatus connected to cable 16, the TENS DIGIT counter includes an output lead 114 which is connected in multiple to the cathodes of those diodes 66 of the scanner AND gates which have their associated diodes 63 connected to the bottom row of patch board 26 via channel 31. Each of these AND gates has the cathode of its diode 65 connected to a different one of the leads 94 through 103 of the UNITS DIGIT counter. In addition, a manually operable switch 115 having ganged armatures is provided, which upon closure applies potential from a negative source to base electrodes of transistors $Q_1$ of the first stage of each counter through leads 116. When switch 115 is momentarily closed, negative potential applied via leads 116 is coupled through the base-to-emitter junctions of the first-stage transistors $Q_1$ of each counter to emitter busses 83, thereby driving the transistors of all other stages of the counters to cutoff. When transistors $Q_1$ of the first stages of the counters begin to conduct, the positive going potentials induced at their collector electrodes 78 are coupled through resistors 87 to drive first-stage transistors $Q_2$ into conduction. The resultant negative going potential at collectors 84 of first-stage transistors $Q_2$ is fedback through resistors 91 to hold transistors $Q_1$ in conduction even though switch 115 is opened to disengage the negative source from transistors $Q_1$. In this state, the first stages of both the UNITS DIGIT and TENS DIGIT counters are conducting however, no signals appear on the output bus 69 of the scanner (FIG. 4) because none of the diodes 65 are energized by the first stage of the UNITS DIGIT counter. Upon the application of the first ten clock pulses, the UNITS DIGIT counter is stepped through a complete operative cycle, energizing in sequential order each of its leads 94 through 103. During this cycle, each of the scanner AND gates which are connected to the test potential generators are rendered conducting by virtue of lead 114 being connected in multiple to the cathodes of their diodes 66, while leads 94 through 103 are severally connected to the cathodes of their diodes 65.

Upon the application of the clock pulse serving to turn off the last, or eleventh, stage of the UNITS DIGIT counter, a negative going step is coupled through its capacitor 92 to turn on the second stage of the UNITS DIGIT counter and hence begin another cycle of operation. As was previously noted, only the last ten stages of the UNITS DIGIT counter are for scanning purposes since only those stages include connections to diodes 65 of the AND gates. Similarly, when the last stage of the TENS DIGIT counter is turned off, a negative going pulse is coupled through its capacitor 92 to the second, not the first, stage of that counter. Thereafter, all normal cycles of the TENS DIGIT counter begin with the operation of the second stage, and the first stage remains off until activation by the closure of switch 115. By these means, the counter normally counts to one hundred, but upon command, that is to say closure of switch 115, the counter executes a single cycle of one hundred and ten digits so as to enable scanning of the test potentials of cable 16 as well as the reaction signals of the selected audience. If it is desired to reset the counter without having the test potentials scanned, a manually operable switch 117 having ganged armatures is provided for applying potential from the negative source through leads 118 to base 80 of transistor $Q_1$ of the first stage of the UNITS DIGIT counter, and to base 80 of the transistor $Q_1$ of the second stage of the TENS DIGIT counter. In this manner, the first stage of the TENS DIGIT counter is bypassed so that lead 114 remains unenergized and consequently does not activate the scanner AND gates associated with the test potentials.

The lamps 90 of indicators 250 may be embodied in any one of a number of conventional configurations which provide a visual display continuously indicating the digits to which the counter has advanced. In one convenient embodiment the indicators comprise eleven transparent plates (not shown) of light conducting substance arranged in stacked order, one of the plates being blank while the remaining ten plates have the numerals zero through nine singularly etched on their surfaces. The stacks are aligned with respect to lamps 90 so that the plates are individually edge lighted by the lamps of the stages corresponding to the numerals etched on the plates. Thus, for example, when the third stage of the UNITS DIGIT counter and the forth stage of the TENS DIGIT counter are turned on, thereby representing the count twenty one, only the plate of the UNITS DIGIT indicator 250 having the numeral one etched on its surface will be illuminated, and only the plate of the TENS DIGIT indicator 250 having the numeral two etched on its surface will be illuminated. Since the remaining plates of the stacks are dark, the illuminated etched numerals will show through the stack to display the digit twenty-one to which the counter has advanced. It will be noted that while the lamps associated with plates having etched numerals glow white, the lamps associated with the first, or test scan, stages of the counters glow red so as to denote in a distinctive manner that the test potentials are being scanned.

With reference again to FIG. 1, the output line 62 of scanner 60 is shown forked, a first branch 119 being connected to an amplitude-to-line converter 120, and a second branch 121 being likewise coupled to a digital resolver 122. Converter 120 comprises a single input line 119 and a plurality of output leads 123, each of the latter representing a different incremental amplitude value of input signal. In aggregate, output leads 123 are arranged in order with the bottom lead corresponding an input signal having its amplitude lying in the lowest increment of the range of possible input values, and the uppermost lead corresponding to an input signal having its amplitude lying in the highest increment. Thus, upon the application of an input signal to converter 120 characterized by an amplitude of a particular value, only the single output lead 123 is energized which corresponds to the increment in which that amplitude lies.

Figure 6:
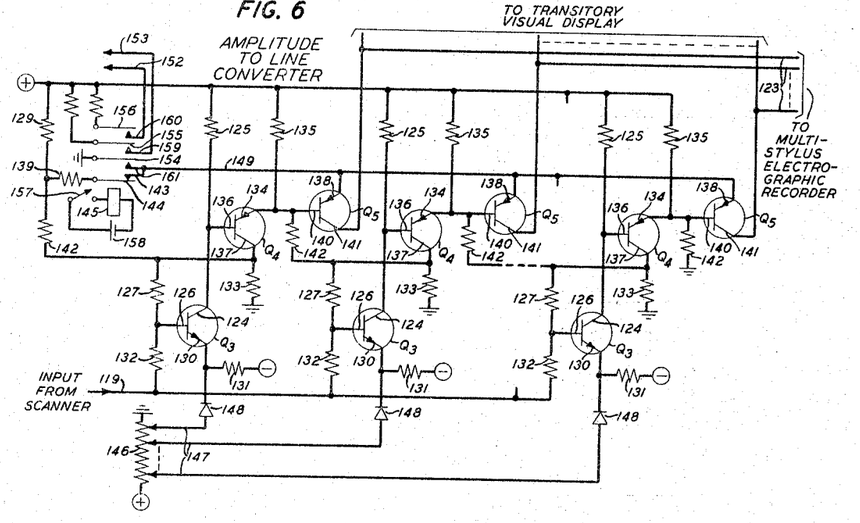
FIG. 6 illustrates a converter circuit which functions to energize its output leads individually in accordance with the magnitude of audience reaction signals applied to its input terminal.

An illustrative circuit embodiment of an amplitude-to-line converter operative in accordance with the foregoing description is shown in FIG. 6. As shown in that drawing, the converter comprises a plurality of stages which individually correspond to different ones of output leads 123, each of the stages including transistors $Q_3$, $Q_4$ and $Q_5$. Transistor $Q_3$ is of the NPN variety and comprises a collector electrode 124 which is coupled to a source of positive potential through resistor 125, a base electrode 126 which is coupled to the same positive source through serially connected resistors 127, 142, and 129, and an emitter electrode 130 which is coupled to a source of negative potential by a resistor 131. Input signals to each stage from input lead 119 are applied to base 126 through resistor 132. The junction between resistors 127 and 142 is returned to ground through resistor 133. Transistor $Q_4$ is of the PNP variety having an emitter electrode 134 coupled to the source of positive potential through resistor 135, a base electrode 136 which is directly coupled to collector 124 of that stage's transistor $Q_3$, and a collector electrode 137 which is returned to ground through resistor 133. Transistor $Q_5$, the output element of the stage, is also of the PNP variety and comprises an emitter electrode 138 coupled to the source of positive potential through line 149, armature 143 and back contact 144 of relay 145, and series resistors 139 and 129, a base electrode 140 which is directly coupled to emitter 134 of that stage's transistor $Q_4$, and a collector electrode 141 which conductively extends into the output lead 123 of that stage. Each of the stages is electrically interconnected with the immediately following stage by means of a resistor 142 joining base 140 of transistor $Q_5$ with the junction between resistors 127 and 133 of the succeeding stage. Emitter electrode 130 of each transistor $Q_3$ is clamped to a distinct predetermined potential by means of a voltage divider arrangement including a tapped resistor 146 across which is impressed a positive potential to ground. At uniform spacing along resistor 146 a plurality of tap points 147 are distributed from which a corresponding plurality of diodes 148 are severally connected to emitters 130. As shown, diodes 148 are poled in a direction opposing the polarity of the so-called base-to-emitter diodes of the transistors $Q_3$.

In the absence of input signals on line 119, all transistors of the converter are nonconducting, the positive potential applied to emitters 130 of transistors $Q_3$ by resistor 146 via diodes 148 exceeding the potential at base 126 of those transistors. When the potential of line 119 rises sufficiently to bring the base potential of transistor $Q_3$ of the first stage above the potential to which its emitter 130 is clamped, current begins to flow through resistor 125 of the first stage, thereby lowering the potential at base 136 of first stage transistor $Q_4$ sufficiently to initiate conduction in that transistor. As a result, current originally flowing through resistor 135 is increased by the introduction of an additional current path through the now conducting transistor $Q_4$. Consequently, the potential at base 140 of first stage transistor $Q_5$ is lowered sufficiently to render that transistor conducting. In effect, transistor $Q_5$ acts as a switch which when closed applies the positive potential of line 149 to output lead 123.

When the potential of line 119 rises even further to permit the base potential of transistor $Q_3$ of the second stage to conduct, transistors $Q_4$ and $Q_5$ of the second stage also begin to conduct in the same fashion as their counterparts in the first stage which were rendered conducting. However, when transistor $Q_4$ of the second stage conducts, the potential of its collector 137 is driven more positive, which correspondingly tends to decrease current flow through resistor 135 of the first stage. Consequently, the potential drop across resistor 135 is reduced to a point where the first-stage transistor $Q_5$ is once again turned off. Since the operation of each stage may be similarly analyzed, it is immediately seen that for each value of potential impressed on line 119, only a single one of output leads 123 is energized. Stating this principle somewhat differently, each stage has an incremental range of input signal values, the application of which results in only the output lead 123 associated with that stage being energized. The taps along resistor 146 are arranged so that the converter is operative throughout the entire range of audience reaction signals applied via line 119. Although the converter of FIG. 6 may comprise almost any number of stages depending upon the input signal resolution desired, it was found that a converter comprising one hundred stages functioned particularly well.

It will be recalled that the analog-to-line converter 120 is driven by a single emitter follower transistor amplifier designated by reference numeral 70 in FIG. 4. Since in an extreme case of favorable audience reaction amplifier 70 will be required to drive a large number of transistors $Q_4$, one hundred for example, it is particularly important that the input current drain of each conducting stage be kept to a minimum. Accordingly, the circuit configuration illustrated in FIG. 6 is especially advantageous in that it tends to maximize the input impedance of each stage. More particularly, each of the transistors $Q_3$ which is rendered conducting tends to draw current from line 119 through its base-to-emitter path to negative source. Upon conduction of any transistor $Q_3$, however, the transistor $Q_4$ of that stage is also rendered conducting in the manner previously described. As a consequence, the potential drop across the resistor 133 associated with the now conducting transistor $Q_4$ is increased. Hence, by virtue of the feedback path conductively coupling collector 137 of transistor $Q_4$ to the junction between resistors 127 and 142, a portion of the current translated by transistor $Q_4$ is diverted from resistor 133 and shunted instead through the base-to-emitter path of transistor $Q_3$, thereby correspondingly reducing the input current drain of that stage on line 119 and in essence raising the effective input impedance of the converter as a whole.

With reference once again to FIG. 1, it will be observed that each output lead 123 of converter 120 is connected in multiple to two units, a transistory visual display 150 and a multistylus electrographic recorder 8. Display unit 150 comprises a plurality of lamps 151 each of which is individually connected to be ignited upon energization of a separate one of leads 123. As shown, the bottom output lead 123 of converter 120 corresponding to an input signal on line 119 lying in the highest incremental range, thereby signifying the most favorable audience reaction, is connected to ignite the lamp 151 disposed furthest to the right. The progressively higher leads 123 are connected in orderly fashion to the remaining lamps 151 situated further to the left. Thus, display unit 150 yields a transient but conveniently observable presentation in sequential order of the reactions expressed by individual members of the selected one-hundred member audience. By visually correlating the flashing lamps 151 of unit 150 with indicators 250, it is possible to determine at a glance which reactions are being expressed by which members of the audience.

Output leads 123 are also connected to individual metallic styluses of electrographic recorder 8. As is conventional, recorder 8 includes a carriage mechanism for continuously transporting sensitized paper over a conducting plate held fixed at a constant potential such as ground. The stylus are poised over the paper and plate in a row transverse to the paper's direction of motion. When one of the lead 123 is energized, the potential is transferred to the tip of the associated stylus thereby creating a displacement current which flows through the paper to the plate. This current leaves an imprint on the paper indicating thereby which stylus, and hence what degree of audience reaction, was expressed at that particular time. In addition, since every one-hundredth imprint on the paper represents the reaction of the same individual, a continuous graph of that individuals reactions may be easily derived by drawing a line joining all these points.

It will be noted from FIG. 1 that a lead 152 emanating from converter 120 is connected to recorder 8 at a point below the lowest of the output leads 123. Lead 152 is thereby connected to an additional stylus which is positioned in such manner that when energized an imprint is created along the edge of the sensitized paper. Lead 153, also emanating from converter 120, is connected in somewhat similar fashion to drive units of separate pens in recorders 1 through 7 so that upon energization, marks are made along the edge of the recording media in each of the enumerated recorders. As will be explained below, these distinctively placed marks may be made at will, and are particularly useful to indicate on the recording media the occurrence of specified events.

The circuitry by which leads 152 and 153 are energized is associated with converter 120, and, therefore, is illustrated in detail in FIG. 6. As shown in that drawing, relay 145, upon being energized by closure of switch 157, is positioned to pull down not only armature 144, but armatures 154 through 156 in addition. Relay 145 is energized at will by closure of two-position manual switch 157 which impresses the potential of battery 158 across its operating winding. Upon the operation of relay 145, armatures 155 and 156 close with their respective contact member 159 and 160 to energize leads 152 and 153 with potential from the positive source. The need for a separate lead, namely 152, to energize the events marker of electrographic recorder 8, while a single lead 153 may be used to energize the events markers of recorders 1 through 7, arises by virtue of the fact that when the events marker stylus of recorder 8 is energized, the resulting displacement current provides a low impedance path coupling lead 152 to ground. Hence, after the events marker stylus of recorder 8 has fired, sufficient potential is not available on lead 152 to activate the events marker pen drive units of recorders 1 through 7. To complete the events marker circuitry, armatures 144 and 154 are positioned so that upon operation of relay 145, the former is disengaged from its contact 143 while the latter applies ground potential through contact 161 and line 149 to emitters 138, thereby preventing any of the transistors $Q_5$ from being rendered conducting. Since ordinarily in electrographic recorders only a single stylus at a time is capable of sustaining a displacement current, transistors $Q_5$ are disabled during the activation of events marker lead 152 to insure that any other styluses which either are firing or may fire during closure of switch 157 will be de-energized, thereby allowing the events marker stylus to sustain its displacement current upon operation of relay 145.

With reference again directed to FIG. 1, it will be recalled that multiplexed audience reaction signals from scanner 60 are also applied to digital resolver 122 through serially disposed lines 62 and 121. Digital resolver 122 comprises a plurality of output leads 162 which are individually connected to a conventional numerical print-out recorder 9 which, as its name implies, is operative in well-known fashion to count the number of times each of the leads 162 is energized and furnish a printed record of this information upon the application of an activating signal. Digital resolver 122 is somewhat similar to the amplitude-to-line converter 120 in that both units function in response to an amplitude varying input signal to selectively energize their output leads in accordance with the magnitude of the input signal. The principal difference between the two units is that while converter 120 is adapted to operate continuously, resolver 122, as will be fully explained below, includes apparatus which permits operation only upon command.

Figure 7:
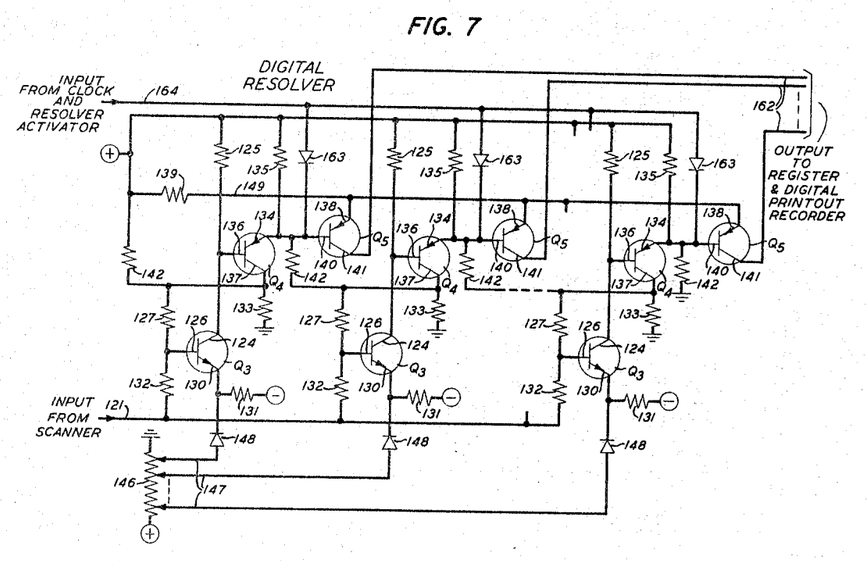
FIG. 7 illustrates a resolver circuit which upon application of a command signal segregates applied reaction signals of a viewing audience into groups according to reaction.

An illustrative circuit embodiment of resolver 122 is depicted in FIG. 7, which for the most part is similar to the converter of FIG. 6 in both construction and operation, coresponding elements of each units being identically numbered. In order to render the resolver operative only upon command, as distinct from the continuous operation of the converter 120, a plurality of diodes 163 are provided which are properly poled to apply positive potential from line 164 to the bases 140 of transistors $Q_5$, thereby preventing those transistors from being driven into conduction. When, upon command, the potential of line 164 is lowered sufficiently to reverse-bias diodes 163, the resolver is enabled to energize the appropriate ones of its output leads 162 in accordance wtih the magnitude of the input signal applied via line 121. The potential of line 164 is governed jointly, as will be explained, by both clock 165 and a resolver activator 166.

In a preferred embodiment of the invention, the digital resolver of FIG. 7 comprises five stages of which taps 147 are positioned along resistor 146 in such manner that the input signal amplitude increments over which the stages are operative center upon the potentials existent at lead 121 when selector knob 15 of dial 14 (FIG. 2) is pointed directly at the segmental demarcations. Thus, when selector knob 15 is pointed to the area surrounding the "very dull" demarcation, output lead 162 of the first stage of the resolver will be energized, provided of course that diodes 163 are reverse biased. Similarly, output leads 162 of the other stages are individually energized when selector knob 15 is turned to the segmental areas of dial 14 with which those stages are associated.

When arranged in the preferred embodiment described above, and activated by signals on line 164 timed to enable operation of transistors $Q_5$ during the reception via line 121 of multiplexed signals from each of the selected audience members, the digital resolver is ideally suited for use as an audience polling machine. For example, in addition to deriving recorded data representing audience reaction during the course of a performance, it may be desired to interrogate the selected audience, either before or after the performance, concerning questions having as many as five alternative answers. In such a case, a question is put to the audience and the individual members respond by turning selector knob 15 of their dials 14 to the appropriate demarcation representing their answer to the question. As an illustration, the question may be asked, "Do you attend motion picture theaters less than once, twice, three, or more than three times a month?" where each demarcation on dial 14 represents a different one of the alternative answers. After the lapse of sufficient time for the audience to adjust their selector knobs to the correct response, the counter 61 is activated to generate a one-hundred digit counting cycle, thereby energizing the scanner 60 to introduce a complete multiplex frame of one-hundred audience reaction signals into the digital resolver via lead 121. Simultaneously, as will subsequently be explained, signals are applied to lead 164 of the resolver (FIG. 7) which reverse-bias diodes 163, thereby permitting operation of the resolver only during the single frame in question. In response, the various output leads 162 are energized in accordance with the different answers indicated by the audience on their dials 14. Upon completion of the frame, a readout pulse is applied to recorder 9 which responsively prints a record of the number of audience members giving each of the alternative answers. Since the selected audience polled with the digital resolver comprises one-hundred members, print-out recorder 9 inherently expresses its information directly in percentages.

Figure 8:
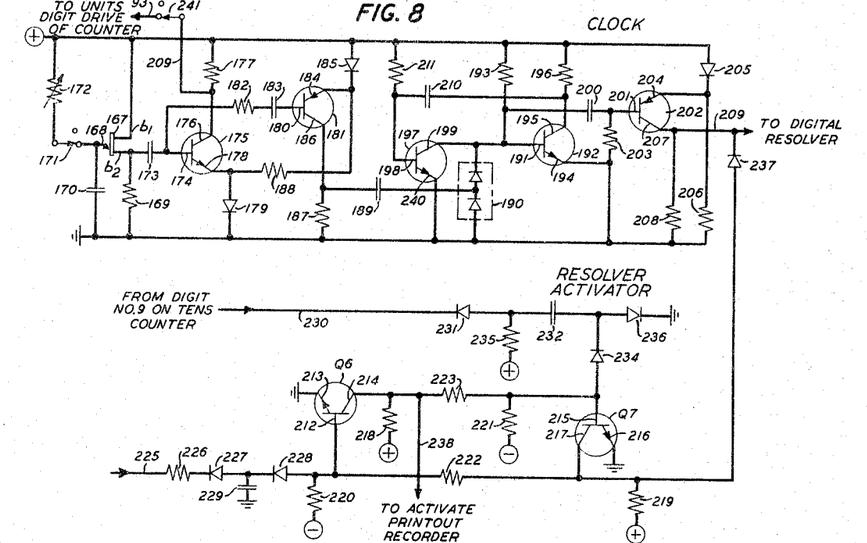
FIG. 8 depicts both the system synchronizing unit, or clock, and the resolver activator which generates pulses to enable command operation of the resolver of FIG. 7.

An illustrative circuit embodiment of clock 165 and resolver activator 166, which in combination energize line 164 in a manner to render the digital resolver operative during a single scan of the selected audience, is shown in FIG. 8. The principal timing element of the clock comprises a three-electrode voltage breakdown device 167, for example, a General Electric #2N489 unijunction transistor having dual bases $b_1$ and $b_2$ and emitter 168. Breakdown device 167 is characterized in its operation, when biased as shown in the drawing, by residing in a state of nonconduction until a predetermined ratio exists between the potential difference across the base-to-base path and the potential difference across the base-to-emitter ($b_2$) junction, at which time breakdown occurs thereby allowing current to flow from base $b_1$ to base $b_2$ and rendering the emitter-to-base ($b_2$) junction substantially a short circuit. As unijunction element 167 is connected in the clock circuit, base $b_1$ is coupled to a source of positive potential, base $b_2$ is connected to ground through a resistor 169, and emitter 168 is coupled both to ground through timing capacitor 170 and to the source of positive potential through the normally closed armature of manually operable switch 171 and variable resistor 172. Base $b_2$ of breakdown device is connected through a capacitor 173 to the base 174 of NPN-type transistor 175. As shown in the drawing, transistor 175 comprises in addition to base 174 a collector electrode 176 which is connected through a resistor 177 to the positive source, and an emitter electrode 178 connected to ground via a diode 179. Base 174 of transistor 175 is connected to base 180 of a PNP-type transistor 181 through a series combination of resistor 182 and capacitor 183. Transistor 181 also comprises an emitter electrode 184 which is coupled to the positive source through a suitably poled diode 185, and a collector electrode 186 which is connected to ground through a resistor 187. Emitters 178 and 184 of transistors 175 and 181, respectively, are joined together by a resistor 188. Collector 186 is connected through a capacitor 189 and a double diode polarity selector 190 to base electrode 191 of transistor 192. As shown, transistor 192 is of the three electrode NPN variety, of which base electrode 191 is connected to the positive source through a resistor 193, emitter electrode 194 is coupled directly to ground potential, and collector electrode 195 is connected to the positive source through a resistor 196. Collector 195 is coupled back to base 191 through a buffer transistor 197 of which base electrode 198 is coupled to collector 195 through capacitor 210 and to the positive source through resistor 211, emitter 240 is coupled to ground, and collector 199 is connected jointly to polarity selector 190 and base 191. Collector 199 is also coupled to the base electrode 201 of output transistor 202 through a blocking capacitor 200. Transistor 202 is of the PNP variety comprising base electrode 201 which is coupled to ground through resistor 203, an emitter electrode 204 which is coupled both to the positive source through a suitably poled diode 205 and to ground through resistor 206, and a collector electrode 207 which is coupled to ground through a resistor 208. Collector 207 is further coupled to line 164 of the digital resolver (FIG. 7) for the purpose of applying signals which enable operation of the resolver.

In operation, capacitor 170 is charged from the positive source through variable resistor 172 until the potential at base electrode 168 is sufficiently high to force unijunction element 167 into conduction. When unijunction element 167 conducts, capacitor 170 discharges to ground through the emitter-to-base ($b_2$) path of device 167 and resistor 169, thereby tending to induce a positive pulse across resistor 169, which endures until the potential at base 168 reaches cutoff value. This positive pulse is differentiated by virtue of capacitor 173 into a positive going impulse substantially coincident with the leading edge of the positive pulse, and a negative going impulse substantially coincident with the trailing edge of the positive pulse. The positive going impulse drives transistor 175 into conduction, thereby inducing a negative signal at collector 176 which is coupled to base 74 of drive transistor $Q_d$ of the UNITS DIGIT counter (FIG. 5) through lead 209, the armature and contact of normally closed manually operable switch 241, and lead 93 and the input capacitor. It is evident, therefore, that the system counter 61 (FIG. 1) is advanced from digit to digit each time breakdown device 167 is driven into conduction, the rate of advance being controllable over a wide range of values by changing the impedance of variable resistor 172. In addition, the counter 61 may be held indefinitely on any particular digit by promptly opening the armature of switch 241 when indicator 250 (FIG. 1) shows that the counter has advanced in count to that particular digit.

The negative going impulse which results from differentiation of the positive pulse induced across resistor 169 is coupled through resistor 182 and capacitor 183 to base 180 of transistor 181, thereby driving that transistor into conduction and inverting the negative going impulse into a positive signal at collector 186. This positive signal is coupled through polarity selector 190 to base 191 of transistor 192, thereby driving that transistor into conduction and inducing a negative going signal at collector 195.

Transistor 197, which is normally conducting by virtue of its base voltage from collector 195 being relatively positive, is now cutoff so as to drive collector 199 to a more positive potential. The positive potential now appearing on collector 199 serves to hold transistor 192 in a state of conduction after the positive signal applied to polarity selector 190 via capacitor 189 subsides. The positive potential developed at collector 199 is also coupled through capacitor 200 to base 201 of transistor 202, thereby driving that normally conducting transistor into cutoff. Consequently, the potential of collector 207 of transistor 202 is driven in a negative sense which is the proper polarity for enabling the digital resolver. When transistor 192 commences conduction, capacitor 210 begins to charge from the positive source through resistor 211, thereby sufficiently raising the potential at base 198 to return transistor 197 to a conducting state. Upon conduction of transistor 197, collector 199 is driven negative so as to cutoff transistor 192 and at the same time return transistor 202 to its normal state of conduction. When transistor 202 resumes conduction, the relatively high positive signals at collector 207 returns, and the clock as a whole resides in its relaxed state condition for the commencement of the succeeding operative cycle.

The output signals from collector 207 of transistor 202 are applied via line 209 to line 164 of the digital resolver (FIG. 7), and are of a polarity to reverse-bias diodes 163 thereby enabling the appropriate transistor $Q_5$ to be driven into conduction upon application of a suitable input signal from line 121. It will be recalled, however, that for operation as a voting machine, the digital resolver is to be enabled only during particular scans of the selected one-hundred member audience. To this end, the resolver activator, pictured in FIG. 8 directly below the clock circuit, modulates the amplitude of the output signals from transistor 202 in such manner that diodes 163 of the digital resolver are reverse biased only during selected one-hundred digit cycles of the system counter. As shown in FIG. 8, the resolver activator includes a conventional bistable multivibrator circuit comprising a pair of NPN transistors $Q_6$ and $Q_7$, each having base, emitter, and collector electrodes 212, 213, 214, and 215, 216, 217, respectively. Emitter electrodes 213 and 216 of transistors $Q_6$ and $Q_7$ are connected to ground, collector electrodes 214 and 217 are respectively connected to sources of positive potential through resistors 218 and 219, and bases 212 and 215 are respectively connected to sources of negative potential through resistors 220 and 221. As is conventional in such circuits, the input and output electrodes of the active elements are cross coupled, base 212 being connected to collector 217 by resistor 222, and base 215 being connected to collector 214 by resistor 223. The resolver activator illustrated in FIG. 8 has two separate input signals sources, each one being coupled to the base electrode of a different one of transistors $Q_6$ and $Q_7$. The input signal to base 212 of transistor $Q_6$ comprises a negative wave derived by manual closure of switch 224 (FIG. 5), which is mechanically linked to armatures 117 of counter reset switches 118 and electrically connected to the same negative source as those armatures. Switch 224 is connected to base 212 through line 225, a resistor 226, and a pair of diodes 227 and 228 both poled to conduct negative signals toward transistor $Q_6$. The junction between the diodes is coupled to ground through a capacitor 229. The input signal to base 215 of transistor $Q_7$ originates from the output lead of the final, or digit nine, stage of the TENS DIGIT counter (FIG. 5), and is translated to its destination via serially connected line 230, diode 231 which is poled for transmission of negative impulses, capacitor 232, and diode 234 which is also poled for transmission of negative impulses. As shown, the anode of diode 231 is connected to a positive source through resistor 235, and the cathode of diode 234 is coupled to ground through another diode 236. The resolver activator circuit is completed by the connection of collector 217 of transistor $Q_7$ to output line 209 of the clock by means of a diode 237 poled to conduct positive signals from the activator to the clock.

In the quiescent state of the resolver activator, that is to say, when the activator is conditioned such that the digital resolver is not enabled, transistor $Q_6$ is conducting, and concomitantly transistor $Q_7$ is cutoff. In such a case, collector 217 of transistor $Q_7$ at a relatively high positive potential to which output line 209 of the clock circuit is clamped via diode 237. Consequently, when the activator is in its quiescent state, output line 209 is prohibited from reducing its potential to a sufficiently low value for diodes 163 of the resolver to become reverse biased, hence the resolver is continually disabled.

When it is desired to utilize the digital resolver as a voting machine, switch 224 (FIG. 5) is momentarily closed, thereby applying a negative going signal to base 212 so as to drive transistor $Q_6$ to cutoff. By virtue of the mechanical linkage, counter reset switches 118 are operated in unison with switch 224 so that voting may commence at the beginning of a counter cycle. In accordance with conventional multivibrator operation, when transistor $Q_6$ ceases to conduct, collector 214 is driven positive, thereby applying a positive going wave to base 215 which forces transistor $Q_7$ into conduction. Upon conduction of transistor $Q_7$, collector 217 assumes ground potential, thereby allowing output lead 209 of the clock circuit, if energized with a negative going signal, to fall sufficiently negative to reverse-bias diodes 163 of the digital resolver. Consequently, each time output transistor 202 of the clock circuit is momentarily driven to cutoff, diodes 163 are reverse biased, and the appropriate output lead 162 of the resolver is energized in accordance with the magnitude of the input signal applied to the resolver via line 121. Upon the TENS DIGIT counter having advanced in its count to the nine, or final stage, a positive potential is applied via line 230 to reverse-bias diode 231. As a result, capacitor 232 charges through resistor 235 to a potential substantially equal to that appearing at the cathode of diode 231. When the positive pulse on line 230 subsides, thereby signifying the termination of a complete one-hundred digit cycle of the counter, its trailing edge generates a negative going signal which is passed through diode 234 so as to drive transistor $Q_7$ to cutoff. In response, collector 217 once again assumes its positive value which is coupled to base 212 so as to turn on transistor $Q_6$. The positive potential of collector 217 is also applied to output lead 209 through diode 237, once again preventing the potential on that lead from being lowered sufficiently to enable the digital resolver. At the same time, the potential at collector 214 is stepped toward ground, which results in a negative going impulse being applied via lead 238 as a print-out pulse for recorder 9. Thus, when it is desired to poll the selected audience, the system counter is reset and at the same time the digital resolver is enabled. At the termination of a complete counting cycle, the resolver is once again disabled, and a print-out recorder is activated to supply a printed record of the audience vote.

From the foregoing detailed description of one illustrative embodiment of an audience reaction evaluation system constructed in accordance with the principles of the invention, it will be recognized that the invention affords a comprehensive measure of audience reaction both continuously during a performance, and in tabular form at any selected time. Not only is audience reaction measured and displayed continuously in terms of the composite, or average, response of a selected group of the entire audience, but it may be measured also in terms of the composite response of selectable subgroups within the selected audience. Furthermore, the invention enables the recordation of periodic responses of each member of the selected audience on an individual, as distinguished from a group, basis. Still further, the invention provides for recording the continuous response of any selected individual member of the entire audience. In the particular embodiment described above, the only audience participation required in order to obtain this comprehensive panorama of data is the manipulation of a dial or some other similar device which is sized to fit conveniently into the palm of a viewer's hand.

Although only a single embodiment of the invention has been described herein, it is to be understood that numerous other arrangements of audience reaction evaluation apparatus may be conceived without departing from the spirit and scope of the invention.

What is claimed is:

1. A system for measuring the response of an audience to a performance comprising a plurality of selector means individually distributable to separate members of said audience, a separate output circuit associated with each of said selector means, means included in said selector means for deriving an electrical signal associated with each of said selector means representative of the reactions of a separate member of said audience, means for coupling said electrical signals to respective ones of said output circuits, first recording devices, means for selectively coupling said electrical signals to said first recording devices, second recording devices, means for coupling said electrical signals in a plurality of preselected groups to said second recording devices, a third recording device, means for applying representations of different ones of said electrical signals in sequence to said third recording device, resolving means for segregating said electrical signals into categories according to the reactions of said members of said audience, said resolving means including both an input circuit for coupling said electrical signals to said resolving means and output means distinctive to each of said categories, fourth recording devices, and means for connecting said output means to said fourth recording devices.

2. A system for measuring the response of an audience to a performance in accordance with claim 1 wherein said selector means comprise potentiometers each having impedance means, means for applying electrical energy to said impedance means, and variable detecting means for sensing selectable portions of said electrical energy for application to said output circuit.

3. A system for measuring the response of an audience to a performance, wherein the members of said audience are seated in rows, comprising a source of electrical potential, means for providing electrical transmission paths individually associated with said rows, each of said paths being terminated at one end by said source of electrical potential, variable transmission devices connected to each of said paths, each of said variable transmission devices representing a separate member of said audience, means under the control of said audience members for varying the transmission characteristics of said variable transmission device, a separate output circuit included in each of said variable transmission devices, first recording devices, means for selectively connecting said output circuits to said first recording devices, second recording devices, means for connecting said output circuits in preselected groups to said second recording devices, a third recording device, means for electrically connecting different ones of said output circuits in sequence to said third recording device, resolving means for segregating electrical signals into separate channels according to predetermined criteria, means for connecting different ones of said output circuits in sequence to said resolving means, fourth recording devices, and means for connecting said channels to said fourth recording devices.

4. A system for measuring the response of an audience to a performance in accordance with claim 3 wherein said variable transmission devices comprise potentiometers each having a resistor bridged across the said path with which it is associated, and a movable wiper arm variably positionable on said resistor; and said output circuits comprise leads individually connected to said wiper arm.

5. A system for measuring the response of an audience to a performance in accordance with claim 3 wherein each of said paths includes a compensating resistor, said compensating resistors having relative impedance values which are inversely proportional to the distances of said rows from said source of potential.

6. A system for measuring the response of an audience to a performance comprising a plurality of selector means individually distributable to members of said audience, a separate output circuit associated with each of said selector means, means included in said selector means for deriving an electrical signal associated with each of said selector means representative of the reactions of a separate member of said audience, means for coupling said electrical signals to respective ones of said output circuits, means for selecting only a portion of the total number of said output circuits, means for selectively connecting said output circuits individually to first recording devices, means for connecting said selected portion of output circuits in preselected groups to second recording devices, means for electrically connecting said selected portion of output circuits in sequence to third recording devices, resolving means for segregating electrical signals into separate channels according to predetermined criteria, means for connecting said selected portion of output circuits in sequence to said resolving means, fourth recording devices, and means for connecting said channels to said fourth recording devices.

7. A system for measuring the response of an audience to a performance in accordance with claim 6 wherein said means for selecting only a portion of the total number of said output circuits comprises a first device having input terminals to which all of said output circuits are individually connected, a second device having output terminals corresponding to said selected portion of said output circuits, and conduction means for connecting a portion of said input terminals to said output terminals.

8. A system for measuring the response of an audience to a performance in accordance with claim 7 wherein said first and said second devices comprise patch boards, said input and said output terminals comprise jacks mounted on said patch boards, and said conduction means comprise lengths of wire terminated at either end by plugs adapted to be insertable into said jacks.

9. A system for measuring the response of an audience to a performance comprising a plurality of selector means individually distributable to members of said audience, a separate output circuit associated with each of said selector means, means included in said selector means for deriving an electrical signal associated with each of said selector means representative of the reactions of a separate member of said audience; means for coupling said electrical signals to respective ones of said output circuits; a plurality of multiposition switches; each of said switches including a plurality of position-representing terminals, an output terminal, and a selector arm for establishing a conduction path between one of said position-representing terminals and said output terminal; a separate first recording device for each of said multiposition switches, said first recording devices being adapted to provide a charted record of an electrical signal applied thereto, means for connecting said output circuits to said position-representing terminals, means for connecting at least a portion of the total number of said output circuits in preselected groups to second recording devices, means for electrically connecting at least a portion of the total number of said output circuits in sequence to third recording devices, resolving means for segregating electrical signals into separate channels according to predetermined criteria, means for connecting at least a portion of the total number of said output circuits in sequence to said resolving means, fourth recording devices, and means for connecting said channels to said fourth recording devices.

10. A system for measuring the response of an audience to a performance comprising a plurality of selector means individually distributable to members of said audience, a separate output circuit associated with each of said selector means, means included in said selector means for deriving an electrical signal associated with each of said selector means representative of the reactions of a separate member of said audience, means for coupling said electrical signals to respective ones of said output circuits, means for selectively connecting said output circuits to first recording devices, means for severally connecting at least a portion of said output circuits to a plurality of subgroup selector switches, said subgroup selector switches each including a single input terminal and several output terminals, means included in each of said subgroup selector switches for selectively connecting said input terminal to more than one of said output terminals, second recording devices, means for connecting said output terminals to said second recording devices, means for electrically connecting at least a portion of the total number of said output circuits in sequence to third recording devices, resolving means for segregating electrical signals into separate channels according to predetermined criteria, means for electrically connecting at least a portion of the total number of said output circuits in sequence to said resolving means, fourth recording devices, and means for connecting said channels to said fourth recording devices.

11. A system for measuring the response of an audience to a performance in accordance with claim 10 wherein said second recording devices are constructed to provide charted records of the amplitude of electrical signals applied thereto as a function of time.

12. A system for measuring the response of an audience to a performance in accordance with claim 10 wherein said subgroup selector switches each comprise multiple rows of electrical contacts, a movable arm associated with each of said rows, said arms being mechanically linked together for movement in unison, means for connecting said input terminal to said movable arms, said movable arms being disposed to establish conduction paths between said input terminal and said electrical contacts, and means for connecting said electrical contacts to said output terminals in different combinations.

13. A system for measuring the response of an audience to a performance in accordance with claim 12 wherein corresponding output terminals of all of said subgroup selector switches are connected together to form a group of summing busses, each of said summing busses being connected to a separate one of said second recording devices.

14. A system for measuring the response of an audience to a performance in accordance with claim 13 wherein each of said movable arms includes a relatively high impedance summing resistor connected in series therewith.

15. A system for measuring the response of an audience to a performance comprising a plurality of selector means individually distributable to separate members of said audience, a separate output circuit associated with each of said selector means, means included in said selector means for deriving an electrical signal associated with each of said selector means representative of the reactions of a separate member of said audience, means for coupling said electrical signals to respective ones of said output circuits, means for selectively connecting said output circuits to first recording devices, means for connecting at least a portion of the total number of said output circuits in preselected groups to second recording devices, a commutating switch, said commutating switch comprising a plurality of input terminals and an output terminal, means for individually connecting at least a portion of the total number of said output circuits to said input terminals, third recording devices, fourth recording devices, means including a converter for connecting said output terminal to said third recording devices, and means including a resolver for connecting said output terminal to said fourth recording devices.

16. A system for measuring the response of an audience to a performance in accordance with claim 15 wherein said commutating switch comprises a plurality of coincidence circuits, each of said coincidence circuits being individually connected to a separate one of said output circuits, and counter means for sequentially enabling said coincidence circuits to transmit electrical signals appearing on said output circuits to said output terminal.

17. A system for measuring the response of an audience to a performance in accordance with claim 16 wherein said counter means includes an indicator for exhibiting an indication of which said output circuits is presently connected to said output terminal.

18. A system for measuring the response of an audience to a performance in accordance with claim 15 wherein said converter comprises an input lead, a plurality of output leads, said output leads being individually connected to separate ones of said third recording devices, and means for energizing said output leads in accordance with electrical signals energizing said input lead.

19. A system for measuring the response of an audience to a performance in accordance with claim 15 wherein said converter comprises an input lead, a plurality of output leads, said output leads being individually connected to separate ones of said third recording devices, and circuit means for energizing said output leads singly in accordance with the magnitude of electrical signals energizing said input lead.

20. A system for measuring the response of an audience to a performance in accordance with claim 15 wherein said converter comprises a plurality of transistor switching stages, each of said stages having a conducting and a non-conducting state, means for connecting said input lead to each of said stages, means for individually connecting said stages to separate ones of said output leads, means for establishing a plurality of reference signals having discrete levels, each of said reference signals being associated with a different one of said stages, means for individually applying said reference signals to the stages respectively associated with said signals, each of said stages being connected so as to be switched from the nonconducting state to the conducting state when the level of signals on said input lead exceeds the level of reference signal associated with that stage, and feedback means interconnecting the stages for enabling only one of said stages to reside in the conducting state at any particular time.

21. A system for measuring the response of an audience to a performance in accordance with claim 20 wherein said reference signal establishing means comprises a voltage divider and a plurality of taps connected to said voltage divider, said taps being connected to apply said reference signals to said stages in ascending order, and said feedback means being further connected so that only the highest order stage in which the level of signals on said input lead exceeds the level of said reference signal associated with that stage is rendered conducting.

22. A system for measuring the response of an audience to a performance in accordance with claim 19 wherein said third recording devices comprise a recording medium, and means for indicating on said recording medium the order in which said output leads are energized.

23. A system for measuring the response of an audience to a performance in accordance with claim 22 wherein said third recording devices comprise an electrographic recorder having a plurality of styluses to which said output leads are individually connected.

24. A system for measuring the response of an audience to a performance in accordance with claim 15 wherein said resolver comprises an input lead, a plurality of output leads, switching means operative in response to activating signals for selectively energizing said output leads in accordance with a characteristic of electrical signals energizing said input lead, means for generating said activating signals, and means for coupling said activating signals to said switching means.

25. A system for measuring the response of an audience to a performance in accordance with claim 24 wherein said switching means includes a plurality of transistor switching stages, each of said stages having a conducting and a nonconducting state, said input lead being connected to each of said stages, and said stages being connected individually to separate ones of said output leads, means for singly switching said stages into their conducting state in accordance with the magnitude of electrical signals applied to said input lead, said output leads being energized when the stages associated with said output leads are in their conducting state, biasing means coupled to said stages for prohibiting said stages from being switched into their conducting state, and means operative in response to said activating signals for decoupling said biasing means from said stages.

26. A system for measuring the response of an audience to a performance in accordance with claim 24 wherein said fourth recording devices include means for indicating the number of times each of said output leads is energized, said output leads being coupled to said fourth recording devices.

27. A system for measuring the response of an audience to a performance comprising a plurality of selector means individually distributable to separate members of said audience, a separate output circuit associated with each of said selector means, means included in said selector means for deriving an electrical signal associated with each of said selector means representative of the reactions of a separate member of said audience, means for coupling said electrical signals to respective ones of said output circuits, means for selectively connecting said output circuits to first recording devices, means for connecting at least a portion of the total number of said output circuits in preselected groups to second recording devices, a commutating switch, said commutating switch comprising a plurality of input terminals and an output terminal, a counter circuit, means under the control of said counter circuit for electrically connecting said input terminals in sequence to said output terminal, means for individually connecting at least a portion of the total number of said output circuits to said input terminals, third recording devices, means including a converter for connecting said output terminal to said third recording devices, fourth recording devices, and means including a resolver for connecting said output terminal to said fourth recording devices.

28. A system for measuring the response of an audience to a performance in accordance with claim 27 wherein said resolver comprises an input lead connected to said input terminal, a plurality of output leads connected to said fourth recording devices, switching means for singly energizing said output leads in accordance with the magnitude of electrical signals applied to said input lead, means normally operative to inhibit the operation of said switching means, and means including said counter circuit for disabling said inhibiting means for intervals corresponding to complete counting cycles of said counting circuit.

29. A system for measuring the response of an audience to a performance comprising a plurality of selector means individually distributable to members of said audience, a separate output circuit associated with each of said selector means, means included in said selector means for deriving an electrical signal associated with each of said selector means representative of the reactions of a separate member of said audience, means for coupling said electrical signals to respective ones of said output circuits, means for generating a plurality of test signals, a group of test leads individually associated with said test signal generating means, means for coupling said test signals to said test leads, means for selecting only a portion of the total number of said output circuits, means for selectively connecting said output circuits and said test leads individually to first recording devices, means for connecting said selected portion of output circuits in preselected groups to second recording devices, commutating means for electrically connecting said selected portion of output circuits and said test leads in sequence to a conduction path, third recording devices, fourth recording devices, and means for connecting said conduction path to said third and fourth recording devices.

30. A system for measuring the response of an audience to a performance in accordance with claim 29 wherein said commutating means includes a counter circuit connected to generate a first series of digits corresponding to said selected portion of output circuits and a second series of digits corresponding to said test leads, means responsive to said first series of digits for connecting said selected portion of output circuits to said conduction path, and means responsive to said second series of digits for connecting said test leads to said conduction path.

31. A system for measuring the response of an audience to a performance in accordance with claim 30 wherein said counter circuit includes automatic means for periodically generating said first series of digits, means for generating said second series of digits in response to a command signal, and means for generating said command signal.

32. A system for measuring the response of an audience to an occurrence comprising a plurality of selector means individually distributable to at least a portion of the members of the audience, each of said selector means having means for producing an electrical output signal indicative of the selection by a member of the audience to reflect his response to the occurrence, a plurality of output channels, and a plurality of switch means each in circuit with a different one of said selector means for connecting each selector means to at least one of said output channels, whereby said plurality of switch means enable the output signals of said plurality of selector means to be divided to be distributed to said plurality of output channels to reflect the response of audience sub-groups.

33. A system for measuring the response of an audience in accordance with claim 32 and further comprising data processing means connected to said output channels, whereby the data of the output signals of said selector means can be processed to reflect the response of audience sub-groups.

34. A system for measuring the response of an audience in accordance with claim 32 and further comprising a plurality of recording means connected to said output channels, whereby the data of the output signals of said selector means can be recorded to reflect the response of audience sub-groups.

35. A system for measuring the response of an audience in accordance with claim 32 in which each of said plurality of switch means comprises a switch having a plurality of selectable contacts adapted to be connected to said selector means related thereto, said plurality of contacts being connected in a predetermined pattern to said plurality of output channels, whereby a predetermined number of said selector means can be connected to at least one of said output channels to reflect the response of an audience sub-group.

36. A system for measuring the response of an audience in accordance with claim 32 in which each of said plurality of switch means comprises a plurality of ganged switches in circuit with a different one of said plurality of selector means, each of said ganged switches having selectable contacts connected in a plurality of patterns to said plurality of output channels, whereby each of said selector means can be connected in at least one of the plurality of patterns to said plurality of output channels.

37. A system for measuring the response of an audience in accordance with claim 36 and further comprising a plurality of recording means connected to said plurality of output channels, said selectable contacts of said plurality of ganged switches enabling said selector means to be connected to said plurality of recording means in a plurality of patterns whereby the output of at least one selector means can be recorded by one of said plurality of recording means to reflect the response of an audience sub-group.

38. A system for measuring the response of an audience to an occurrence comprising a plurality of selector means individually distributable to at least a portion of the members of the audience, each of said selector means having means for producing an electrical output signal indicative of the selection by a member of the audience to reflect his response to the occurrence, an output channel, and means for time division multiplexing the output signal of each of said plurality of selector means into said output channel, whereby the output signals of said plurality of selector means can be processed in a sequential signal form.

39. A system for measuring the response of an audience in accordance with claim 38 in which said means for time division multiplexing the output signal of each of said selector means comprises means for providing a predetermined series of control pulses, and means in circuit with said data output channel and actuated in response to the control pulses for scanning the output signals of said selector means, whereby the scanning means samples the output of said selector means into said output channel.

40. A system for measuring the response of an audience to an occurrence comprising a plurality of selector means individually distributable to at least a portion of the members of the audience, each of said selector means having means for producing an electrical output signal indicative of the selection by a member of the audience to reflect his response to the occurrence, a plurality of data processing channels, and a plurality of switch means each in circuit with a different one of said selector means for connecting each selector means to at least one of said data processing channels, means for providing a plurality of reference signals, an output channel, means for time division multiplexing the output signal of each of said plurality of selector means into said data processing channel, and means for selectively conditioning said multiplexing means to time division multiplex the reference signals of the said signal providing means, whereby the output signals of said plurality of selector means and said reference signals can be processed in a sequential form.

41. A system for measuring the response of an audience to an occurrence comprising a plurality of selector means individually distributable to at least a portion of the members of the audience, each of said selector means having means for producing an electrical output signal indicative of the selection by a member of the audience to reflect his response to the occurrence, means for time division multiplexing the output signal of each of said plurality of selector means, a plurality of output channels, and means responsive to each different characteristic of each of the multiplexed output signals of said selector means for directing the multiplexed output signals to predetermined output channels of said plurality of output channels, whereby said multiplexed output signals can be segregated in accordance with the characteristic of each.

42. A system for measuring the response of an audience to an occurrence comprising a plurality of selector means individually distributable to at least a portion of the members of the audience, each of said selector means having means for producing an electrical output signal having an amplitude indicative of the selection by a member of the audience to reflect his response to the occurrence, means for time division multiplexing the output signal of each of said plurality of selector means, a plurality of output channels, and means responsive to each different amplitude of each of the multiplexed output signals of said selector means for directing the multiplexed output signals to a predetermined output channel of one of said plurality of output channels, whereby said multiplexed output signals can be segregated in accordance with the amplitude of each.

43. A system for measuring the response of an audience to an occurrence in accordance with claim 42 and further comprising means connected to each of said plurality of output channels for visually indicating the predetermined output channel to which a multiplexed output signal of said selector means is directed by said directing means, whereby the amplitude of said output signals is indicated in a sequence corresponding to that of said multiplexed output signals.

44. A system for measuring the response of an audience to an occurrence in accordance with claim 43 and further comprising means connected to each of said plurality of output channels for recording the occurrence of a multiplexed output signal of predetermined amplitude directed to one of said output channels by said directing means, whereby the occurrence of each of said output signals of a predetermined amplitude is separately recorded.

45. A system for measuring the response of an audience in accordance with claim 44 and further including means for providing reference signals to said recording means, whereby the recording of said output signals can be provided with a reference value.

46. A system for measuring the response of an audience to an occurrence comprising a plurality of selector means individually distributable to at least a portion of the members of the audience, each of said selector means having means for producing an electrical output signal, the characteristic of which is indicative of the selection by a member of the audience to reflect his response to the occurrence, an output circuit, and means for time division multiplexing the output signal of each of said plurality of selector means into said output channel, a plurality of output circuits, means connected to said output channel and responsive to the characteristic of the multiplexed output signals for distributing the multiplexed output signals to said plurality of output circuits to segregate the multiplexed output signals in accordance with the characteristic thereof, whereby multiplexed output signals having corresponding characteristics can be segregated.

47. A system for measuring the response of an audience in accordance with claim 46 and further comprising means connected to said plurality of output circuits for counting the number of multiplexed output signals segregated thereon by said distributing means, whereby the total of pulses segregated to a given output circuit can be obtained.

48. A system for measuring the response of an audience in accordance with claim 47 and further comprising means connected to said counting means for recording the number of segregated multiplexed output signals being counted, whereby the count of output signals of at least one of said output can be recorded.

49. A system for measuring the response of an audience to an occurrence comprising a plurality of selector means individually distributable to at least a portion of the members of the audience, each of said selector means having means for producing an electrical output signal indicative of the selection by a member of the audience to reflect his response to the occurrence, an output channel, means for providing counting signals, and means connected to said output channel and activated in response to said counting signal, providing means for sequential scanning the output signals of said plurality of selector means onto said output channel, whereby said counting signal providing means enables the extent of operation of said scanning means to be controlled.

50. A system for measuring the response of an audience in accordance with claim 49 and further including means for controlling said counting signal providing means to interrupt the counting signals thereof, the interruption of the counting signals interrupting the actuation of said scanning means, whereby the scanning operation can be terminated at a selectable output signal.

51. A system for measuring the response of an audience in accordance with claim 50 and further comprising means for indicating the count of the counting signal of said signal providing means.

References Cited by the Examiner
UNITED STATES PATENTS

| | | | |
|---|---|---|---|
| 2,514,086 | 7/1950 | Owens | 346—37 |
| 2,712,976 | 7/1955 | Blaustein et al. | 346—33 |
| 3,034,500 | 5/1962 | Blackster | 346—33 X |
| 3,126,513 | 3/1964 | Kamen | 325—31 |

RICHARD B. WILKINSON, *Primary Examiner.*

LEO SMILOW, *Examiner.*

J. W. HARTARY, *Assistant Examiner.*